United States Patent [19]

Nusselder

[11] Patent Number: 4,535,888
[45] Date of Patent: Aug. 20, 1985

[54] STORAGE CASSETTE FOR TWO OR MORE DISK-SHAPED HIGH MEMORY DENSITY INFORMATION CARRIERS

[75] Inventor: Frederik B. Nusselder, Bussum, Netherlands

[73] Assignee: Polygram GmbH, Fed. Rep. of Germany

[21] Appl. No.: 571,369

[22] Filed: Jan. 16, 1984

[30] Foreign Application Priority Data

Jan. 19, 1983 [DE] Fed. Rep. of Germany ....... 3301644

[51] Int. Cl.³ .............................................. B65D 85/30
[52] U.S. Cl. .................................... 206/444; 206/311; 206/449
[58] Field of Search ............... 206/444, 311, 387, 312, 206/449, 451, 456

[56] References Cited

U.S. PATENT DOCUMENTS

| | | | |
|---|---|---|---|
| 4,084,690 | 4/1978 | Pulse | 206/444 |
| 4,089,414 | 5/1978 | Sandor et al. | 206/444 |
| 4,208,117 | 6/1980 | Harvey et al. | 206/444 |
| 4,327,831 | 5/1982 | Inaba et al. | 206/444 |
| 4,347,537 | 8/1982 | Schoettle et al. | 206/387 |
| 4,420,079 | 12/1983 | Gliniorz et al. | 206/387 |

Primary Examiner—Joseph Man-Fu Moy
Attorney, Agent, or Firm—Hill, Van Santen, Steadman & Simpson

[57] ABSTRACT

A storage cassette suitable for the simultaneous storage of two and more tracked disks is provided with a box-shaped center part having an intermediate bottom part which is respectively terminated at its upper side and under side with a cover in the form of a box-shaped floor part, whereby each floor part is hingeable mounted in a hinge at one side at the center part. The cassette construction enables a disk to be supported and held in the cassette adjacent each floor part and on either side of the intermediate bottom part by virtue of a raised seat and peg arrangement centrally disposed on those parts.

8 Claims, 4 Drawing Figures

STORAGE CASSETTE FOR TWO OR MORE DISK-SHAPED HIGH MEMORY DENSITY INFORMATION CARRIERS

CROSS-REFERENCE TO RELATED APPLICATION

The subject matter of copending, commonly assigned U.S. Ser. No. 459,232, filed Jan. 19, 1983, and titled "Storage Cassette For High Storage Density, Disc-Shaped Information Carriers" relates to this application and the disclosure in Ser. No. 459,232, is incorporated herein by reference.

BACKGROUND OF THE INVENTION

The present invention relates to a storage cassette for storing a plurality of disk-shaped information carriers having high storage density such as, for example, an optically-readable video disk or an optically-readable digital record. The inventive cassette construction is generally of a type including a flat, box-shaped bottom portion and a removable or, respectively, hinged cover portion closing the bottom portion at its upper side. When such storage cassettes are employed for optically readable video disks or optically readable digital sound recordings, then, in addition to a certain protection against external influences, such cassettes must also provide sufficient protection against disk warping due to high requirements made of freedom from warp. Apart from the fact that the information carrier must be stored flat in the cassette, it must also be seen to that a potential warping of the cassette is not transferred to the disc carrier within the cassette.

Commonly assigned U.S. Ser. No. 459,232, filed Jan. 19, 1983, concerns a cassette construction for accomodating the high demands made of the disks' freedom from warp wherein the floor of the bottom portion supports the information carrier only in the central area thereof, free of information tracks, on a support elevated relative to the actual floor area on a central peg arrangement extending beyond the upper surface of the support. In the stored condition of the information carrier, the peg arrangement matched to the diameter of the center hole of said information carrier engages into said center hole. In order to guarantee a firm seating of the information carrier, the peg arrangement is expediently shaped into a clamping means. This storage cassette design meets the high demands made of the freedom from warp in the information carrier in an extremely advantageous fashion since no warping of the information carrier should be expected given warping of the storage cassette because the information carrier is only supported centrally on the elevated rest floor part.

It has also been proposed in commonly assigned U.S. Ser. No. 421,281, filed Sept. 22, 1982, to provide a hinged container in the manner of a cassette acceptance container for a magnetic tape cassette into which the actual disc container is inserted.

However, it is believed that not only individual packagings are commercially desired but also cassette packages which enable a combination or a plurality of disk-shaped information carriers to form a repertory collection. An object of the present invention is to design a storage cassette for acceptance of two and more disk-shaped information carriers in the form of a multi-disk storage cassette which also protects against disk warping.

SUMMARY OF THE INVENTION

A storage cassette for disk-shaped information carriers of the type initially described has a box-like center portion forming an intermediate bottom which also has, at its upper and lower sides a respective cover in the form of a box like floor part for the acceptance of a disk-shaped information carrier. Each cover floor part is hingeably mounted in a hinge at one side in the center part. Thus, a double cassette is obtained in a simple manner by means of employing a box-like center part terminated at both sides by the box-like floor part of an individual cassette as a cover. The double cassette guarantees the high demands made of the freedom from warp of the disks stored therein in the same manner as the individual cassette. The center part, further, can be employed for the acceptance of a text insert when it is not designed for the additional acceptance of disks.

In the inventive multiple disk cassette, wherein the box-like center part is likewise designed for the acceptance of a disk at the top and bottom surfaces of its intermediate bottom, the box-like floor parts forming the covers may respectively comprise a floor through forming the actual cover and a tray clampable into the floor trough exhibiting an elevated seat in the form of a center rest peg arrangement. By so doing, it becomes possible to provide the insides of the floor troughs with a text insert whose information is accesible after removal of the tray together with the disk deposited thereon.

Further objects and advantages of the present invention will be apparent to the reader upon reading the detailed description below and with reference to sample embodiments illustrated in the drawing.

DETAILED DESCRIPTION OF THE PREFERRED EMBODIMENTS

Figure 1:
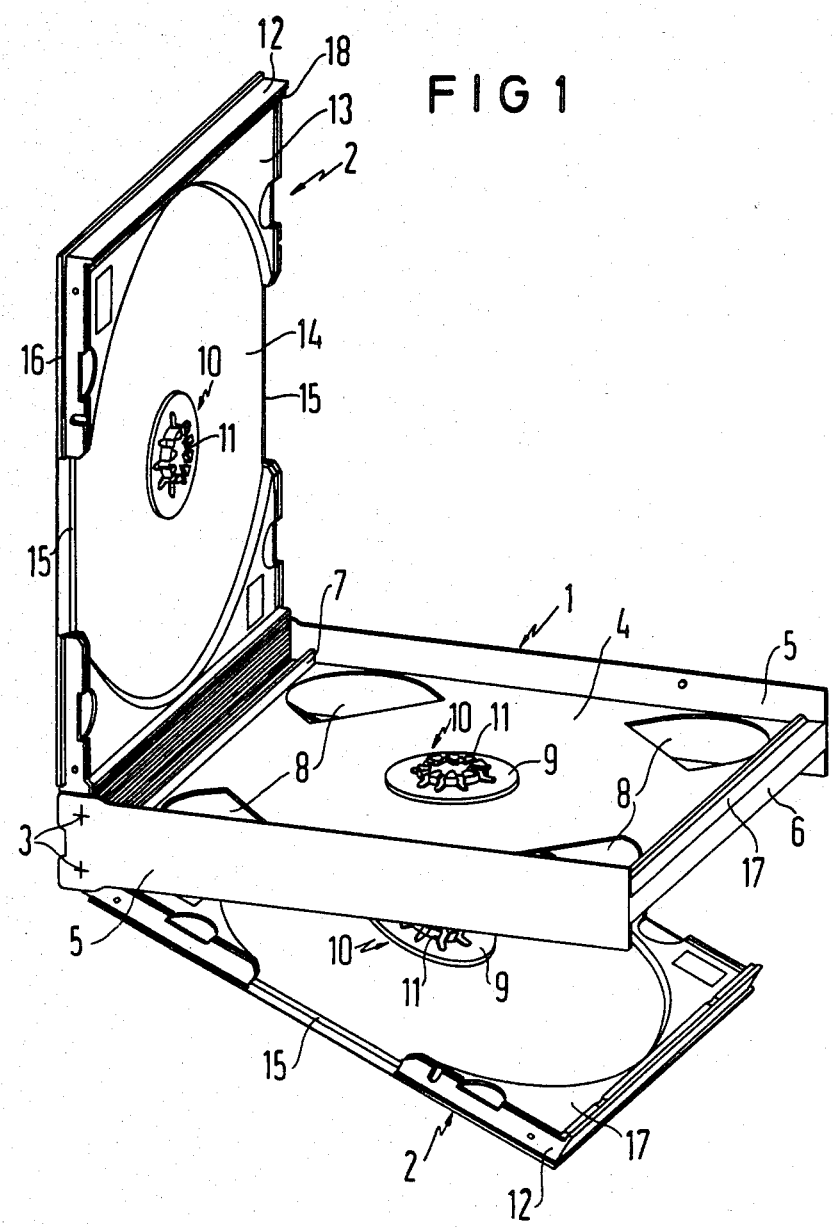
FIG. 1 is a perspective view of a storage cassette for the acceptance of four disks constructed in accordance with the invention.
Figure 4:
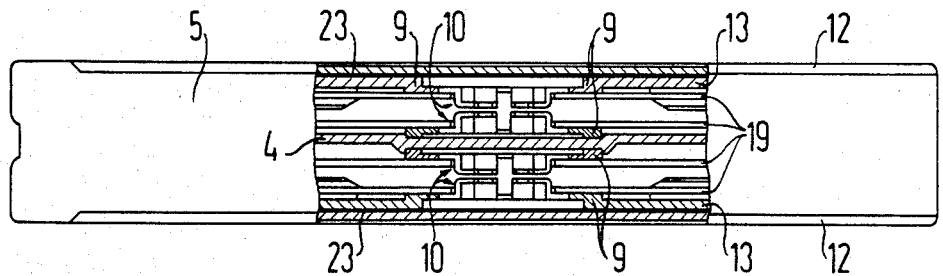
FIG. 4 is a partial cross-sectional view of the storage cassette for four disks according to FIG. 1.

Referring to FIGS. 1 and 4, a storage cassette comprises a box-shaped center part 1 and box-shaped floor parts 2 representing two covers. The floor parts 2 are pivotally mounted in hinges 3 at the back side of the box-shaped center part 1.

The box-shaped center part 1 has an intermediate planar bottom floor 4 extending between laterally opposed upstanding sidewalls 5 running from back toward front sides of the bottom floor 4. At its front side, the box-shaped center part 1 is bounded by a profile strip 6 which, however, is of a lower heiqht in comparison to the sidewalls 5. The box-shaped center part 1 is likewise provided with a profile strip 7 at its back side. The strip 7 is of the same height as the front profile strip 6. At the back side, however, the lateral sidewalls 5 project over the profile strip 7 in order to form the hinge bearing for the box-shaped cover parts 2. The intermediate bottom floor 4 preferably has semi-circular openings 8 adjacent the corner areas to provide a savings of material and weight on the one hand and to also serve as grips through to the other side.

For the purpose of mounting a disk-shaped information carrier 19, the intermediate bottom 4 exhibits a circular, elevated seat rest 9 in its central region on both sides. The plan profile area of the seat 9 is matched to the information-free, central area of the disk. A peg arrangement 10 rises above the seat 9. The peg arrangement 10 is formed of a circumferential plurality of resilient segmented parts 11. These resilient peg segments have the effect of a spring catch upon engagement of the peg arrangement 10 into the center hole of the disk to be deposited on the elevated seat 9.

The box-shaped cover parts 2 each respectively comprise a floor box compartment 12 with a trap 13 clampably inserted therein which exhibits a circular acceptance trough 14 with a support mount for a disk centrally disposed therein formed by another elevated seat 9 having the peg arrangement 10 with its resilient segmented parts 11. The lateral sidewalls of both the floor box 12 and the tray 13 are centrally interrupted by a recess 15 a mutually opposite sides. The recess 15 serves to afford better manipulation of disk when being deposited on or, respectively, removed from the elevated seat peg arrangement 10 of the tray 13.

The vertical depth of the trough 14 recess and of the subspace defined between the opposed profile strips 6 and 7 is at least substantially equal to the vertical height of the seat rest 9 and peg arrangement above the corresponding floor part so as to fully accommodate a disk-shaped carrier therein.

The lateral sidewalls of the floor box 12 are somewhat offset for engagement into the center part 1 between its lateral sidewalls 5 when the cassette is closed. Floor edges 16 of the floor boxes 12 thereby come to lie on the upper edges of the lateral sidewalls 5. The front profile strip 6 also exhibits seating surfaces 17 at both sides for end face edges 18 of front lateral sidewalls of the floor boxes 12.

Figure 2:
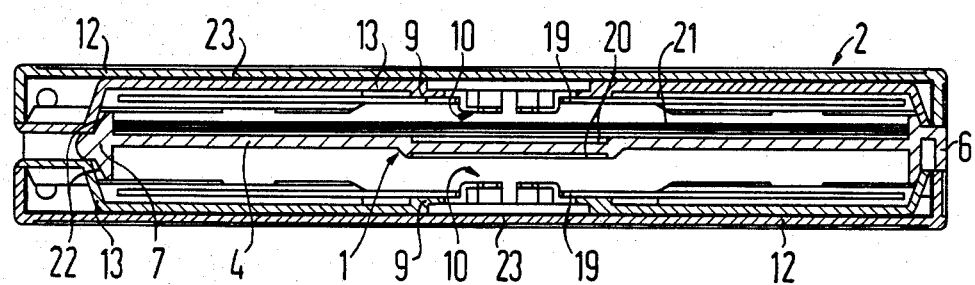
FIG. 2 is a cross-sectional view of a storage cassette of the invention for two disks and a text brochure.

The storage cassette illustrated in FIG. 2 differs from the storage cassette according to FIG. 1 only in that the intermediate bottom 4 of the box-shaped center part 1 is not provided with the elevated seat 9 and peg arrangement 10. This cassette is intended only for the acceptance of two disk-shaped information carriers 19. The intermediate bottom 4, however, exhibits a circular recess 20 on both upper and lower sides as preparation for the acceptance of such elevated seats 9 and peg arrangement 10. In FIG. 2, the box-shaped center part 1 serves for the acceptance of a text brochure 21 on its upper side, as well as its lower side (shown empty here). The disk-shaped information carrier 19 disposed opposite the text brochure 21 cannot be contacted by said text brochure even if it should lift off from the intermediate bottom 4, since, in this case, it can only press against the end face of the peg arrangement 10 and the edge of the tray 13 elevated at the corners. As FIG. 2 further shows, the profile of the back profile strip 7 is designed such at its outside that the box cover floor parts 12 and 13 run up against the slanted outside edge 22 of the profile strip 7 in their condition hinged away from the center part 1 and thus encounter a stop for a limitation of rotational angle.

Figure 3:
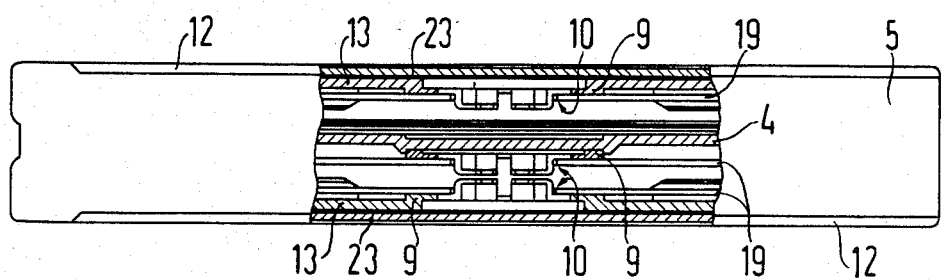
FIG. 3 is a partial cross-sectional view of a storage cassette of the invention for three disks and a text brochure.

The storage cassette according to FIG. 3 differs from the cassette according to FIG. 2 only in that the intermediate bottom 4 of the box-shaped center part 1 is additionally designed at its underside for the acceptance of a third disk-shaped information carrier 19 in that an elevated seat 9 with a peg arrangement 10 is fit into the recess 20 at the underside of the intermediate bottom floor.

FIG. 4 is a cross-sectional view of the cassette arrangement according to FIG. 1 and shows four disk-shaped information carriers 19 in place. Differing from the cassette embodiment according to FIG. 3, thus, an elevated seat 9 with peg arrangement 10 is also let into the upper, circular recess 20 in this case. Thus, by removal of one or both of the elevated seats 9 and peg arrangements 10 on opposed sides of the intermediate bottom floor 4, the storage cassette is able to accomodate respectively one or two text brochures or inserts adjacent the disk information carriers carried by the cover members' floor box and tray 12, 13.

As FIGS. 2 through 4 illustrate, the clearance between the tray 13 and the box floor 12 of the box-shaped floor parts 2 can also be employed for the acceptance of a text insert 23 independently of whether the storage cassette is intended for two, three, or four disk-shaped information carriers 19. The text insert is expediently glued to the bottom of a box floor 12 in the form of a sheet of text. The information is then respectively available after removal of the tray 13.

Although various minor modifications may be suggested by those versed in the art, it should be understood that I wish to embody within the scope of the patent warranted hereon all such modifications as reasonably and properly come within the scope of my contribution to the art.

I claim as my invention:

1. A storage cassette for a plurality of disk-shaped information carriers, each having information tracks, a central area free of information tracks, and a central hole having an inner surface, comprising a box-like center part having a planar intermediate bottom floor and formed on two parallel sides by raised lateral sidewalls extending above and below said bottom floor, a pair of movable box-like cover parts having box floors for overlying said center part bottom floor above and below said bottom floor, hinge pivot bearings in said sidewalls of said center part for connecting together said center part and said cover parts at adjacent ends thereof such that said cover parts are movable toward or away from said center part, and a pair of tray parts for fitting in said cover parts respectively, each defining a disk-shaped trough having a centrally disposed raised seat for receiving and supporting one said information carrier and a central peg means carried on said seat for engaging the inner surface of said carrier's central hole to hold said information carrier adjacent said trough floor.

2. The storage cassette according to claim 1, wherein said cover parts are slightly inset toward the center of their box floors and engage interior of lateral sidewalls of said center part until the outer surfaces of said center part lateral sidewalls engage with overhanging edges of said cover part box floors when said cassette is in a closed condition.

3. The storage cassette according to claim 2, wherein said lateral sidewalls essentially determine the height of the cassette, a pair of profile strips, reduced in height relative to said lateral sidewalls, are formed on the other two parallel sides of said center part on each upper and lower side of said bottom floor, said lateral sidewalls projecting beyond one profile strip where said hinge pivot bearings are located, said one profile strip formed with a stop member coaxial with said bottom floor, and each cover part has an endwall portion for engaging between the hinge pivot bearings for supporting said corresponding cover part for movement between a hinged-open condition and a closed condition in which said cover part endwall portion engages the respective stop member.

4. The storage cassette according to claim 1, wherein corner areas of said intermediate bottom floor are formed with openings such that they allow at least one finger to be inserted through them.

5. The storage cassette according to claim 1, wherein at least one of the upper and lower sides of said intermediate bottom floor has a centrally disposed further raised seat and peg means for supporting and holding at least one further disk-shaped information carrier adjacent said bottom floor.

6. The storage cassette according to claim 5, wherein said lateral sidewalls essentially determine the height of the cassette, a pair of profile strips, reduced in height relative relative to said lateral sidewalls, are formed on the other two parallel sides of said center part on each upper and lower side of said bottom floor, said lateral sidewalls projecting beyond one profile strip where said hinge pivot bearings are located, said one profile strip formed with a stop member coaxial with said bottom floor, and each cover part has an endwall portion for engaging between the hinge pivot bearings for supporting said corresponding cover part for movement between a hinged-open condition and a closed condition in which said cover part endwall portion engages the respective stop member.

7. The storage cassette according to claim 6, wherein said trough floors each define an interior recess area and said opposed profile strips define subspace areas adjacent both upper and lower sides of said bottom floors, said recess and subspace areas being of a vertical height at least substantially equal to the height of the raised seat and peg means.

8. The storage cassette according to claim 1, wherein said tray parts are disposed to be removably clamped into said cover parts.

* * * * *